June 23, 1953  G. VALENSI  2,643,336
ARTIFICIAL CRYSTAL FOR POLARIZATION
OF ELECTROMAGNETIC WAVES
Filed July 21, 1947  5 Sheets-Sheet 1

INVENTOR
GEORGES VALENSI
BY
ATTORNEY

June 23, 1953  G. VALENSI  2,643,336
ARTIFICIAL CRYSTAL FOR POLARIZATION
OF ELECTROMAGNETIC WAVES
Filed July 21, 1947  5 Sheets-Sheet 2

INVENTOR
Georges Valensi
BY Philip M. Bolton
ATTORNEY

INVENTOR
GEORGES VALENSI
BY
ATTORNEY

INVENTOR
GEORGES VALENSI
BY R. P. Morris
ATTORNEY

UNITED STATES PATENT OFFICE 2,643,336

ARTIFICIAL CRYSTAL FOR POLARIZATION OF ELECTROMAGNETIC WAVES

Georges Valensi, Paris, France

Application July 21, 1947, Serial No. 762,448
In France January 29, 1942

Section 1, Public Law 690, August 8, 1946
Patent expires January 29, 1962

7 Claims. (Cl. 250—33.63)

The invention relates to a multiple transmission system in which a number of signals (telegraphy, telephony, television, telecinematography, telephotography, electromechanical remote control, remote measurements, etc. . . . ) are transmitted simultaneously in the same direction or in the opposite directions between fixed or mobile stations, said signals utilizing the same frequency band or the same wavelength interval—the electromagnetic waves carrying these different simultaneous signals differing from each other by their respective states of polarization. This is obtained at the emitting station by means of rectilinear antennas having various orientations, or by means of antenna systems producing hertzian ray beams of different forms and polarizations. Such an antenna system is characterized by a particular combination of antennas with convenient forms (such as rectilinear doublets, loops, etc. . . . )—with convenient relative positions in space—and fed with alternating currents in convenient phase relations between each other. At the receiving station, the discrimination between these electromagnetic waves (carrying the different simultaneous signals) is obtained by means of so-called "artificial pleochroic crystals" associated with the various receiving apparatus, each "artificial pleochroic crystal" absorbing practically the whole energy of all signals except the particular signal which polarization corresponds to said "artificial pleochroic crystal."

Figure 1:
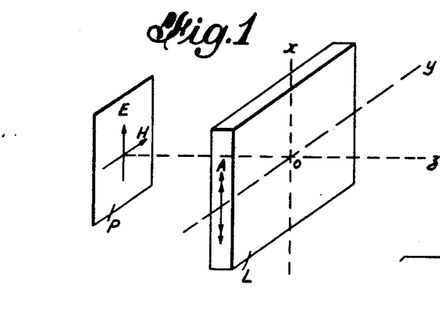
Figure 1A:
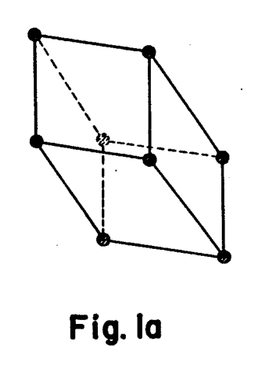

It is well known in optics that a parallelepiped of natural crystal having rectilinear pleochroism (such as tourmaline which is an uniaxis crystal belonging to the rhombohedric system Fig. 1a) and the surfaces of which are parallel to the optical axis of said crystal, propagates two preferred vibrations, without distortion, but with different refraction index and different absorption (or attenuation) index. The appended Figure 1 shows such a pleochroic crystal L with input and output surfaces parallel to its optical axis A (double arrows), and on which fall plane luminous waves P propagated along $oz$, that is to say perpendicularly to the input and output surfaces of L (normal incidence). Said luminous waves are electromagnetic waves; they are supposed to have a rectilinear polarization, P being the plane of the wave, E the electric vector and H the magnetic vector (E and H being perpendicular to each other); this incident light is supposed to be monochromatic, with a wavelength $\lambda$. In the conditions shown on Figure 1, the optical axis A of crystal L being parallel to the electric vector E, the luminous wave is absorbed to the minimum extent in going through L, or, in other terms, the maximum amount of light is transmitted through L.

If crystal L is rotated 90 degrees or $$\frac{\pi}{2}$$

radians in its own plane in such a way that the optical axis A becomes parallel to $oy$ (or perpendicular to the electric vector E), the minimum amount of light is transmitted through L. If crystal L is set again in the initial position (shown in Figure 1) and then rotated, around the axis $oy$, $\theta$-radians in one direction or in the other direction, the absorption index $k$ increases and, moreover, the length $z$ of the luminous path through crystal L increases, so that the product $kz$ increases very much, and consequently the amount of transmitted light decreases in accordance with the following formulas:

$$I = I_0 e^{\frac{-kl}{\cos\theta}} \qquad k = k_e \cos^2\theta + k_o \sin^2\theta$$

In these equations $l$ is the thickness of crystal L; $I_0$ is the incident luminous intensity; $I$ is the transmitted luminous intensity; $k$ is the absorption index of crystal L for the considered direction of the luminous rays; $\theta$ is the angle by which crystal L has been rotated and is also the angle between the optical axis A and the electric vector E; $k_o$, $k_e$ are the principal ordinary and extraordinary absorption index. $k_o$ $k_e$ are constants for a given crystal L, although in fact the ordinary absorption index depends to a certain extent from the direction of propagation of the luminous rays. For example, in the case of tourmaline, in the conditions of Figure 1, and for the monochromatic radiation $\lambda = 5460$ angstroms: $k_o = 17.6$ $k_e = 2.5$, and the transmitted luminous intensity (after a rotation of $\theta$ radians from the vertical position shown on Figure 1) has varied according to an exponential law with the exponent $$\frac{(2.5 + 15.1 \sin^2\theta)}{\cos\theta}$$

For small values of angle $\theta$, the luminous intensity at the output of crystal L has decreased in accordance with the function $e - 15l\theta^2$, that is to say very rapidly when $\theta$ increases. If crystal L is put again in its vertical position shown on Figure 1, and is then rotated $\phi$ radians around the axis $ox$ parallel to the optical axis A in one direction or in the other, no variation in the transmitted light is observed, which is obvious as all optical phenomena in an uniaxis crystal are symmetrical (or of revolution) around the optical axis. Such a crystal L is thus able to discriminate, among various rectilinearly polarized vibrations, the particular vibration having an electric vector parallel to the optical axis A of said crystal L.

Some materials, well known in optics, have a so-called "circular pleochroism" characterized by the difference of absorption for the two circularly polarized vibrations (left and right) in which any incident luminous vibration can always be decomposed.

The electromagnetic waves guided by conductors or dielectric tubes, as well as the freely progressing waves used in radioelectricity, differ from the luminous waves only by the frequency (or wave-length), and it is possible to manufacture "artificial pleochroic crystals" acting as regard said electromagnetic waves (used in electrical communications) in the same way as the natural pleochroic materials act as regard the luminous waves. My invention utilizes such "artificial pleochroic crystals."

Said artificial pleochroic crystals are obtained in placing, inside a supporting dielectric material having very small high frequency power losses, little elements of conducting material, in such a way that said little elements (called hereafter "molecules" of the artificial pleochroic crystal") are located at same points as the chemical molecules of a natural crystal having rectilinear pleochroism, or of a natural material having circular pleochroism. The supporting dielectric material may be air, or any dielectric with small high frequency power factor, such as: trolitul (or polystyrol), ceresin wax, isolantite, mica, paraffin, porcelain, parowax, hard rubber, quartz (fused), steatite, vinyl resin, vitrolex, victron, radio Pyrex glass, special radio Bakelite, etc. . . . The conducting "molecules" may be in metal, solid or hollow, with a symmetrical or dissymmetrical external form; if they are dissymmetric, they may have all the same orientation, or their orientations may be regularly shifted along lines parallel to one axis of the "artificial crystal." These "molecules" might be spheres of very small radius (like little drops), or plane geometrical figures of various forms (such as little rods, or little plane elements of various contours). It is assumed hereafter that, in general, the distances between successive "molecules" are small compared to the wave-length of the utilized electromagnetic waves in order to avoid the diffraction effects; it is also assumed that, in general, the form and the dimensions of a "molecule" are sufficiently different from those of a resonator tuned on the wavelength of the utilized electromagnetic waves in order to avoid the effects of selective absorption (although in certain applications of my invention these effects of selective absorption might be utilized). In other words it is supposed hereafter that the constitution and the form of "molecules" and their relative positions (structure of the artificial crystal) are such that said artificial crystal acts as a homogeneous medium (although anisotrope), absorbing nearly completely one of the two vibrations (rectilinear or circular) propagated without distortion (generally, but not always, the one which travels more slowly, or for which the refraction index is greater), whereas the other vibration is relatively very little absorbed during the transmission through the artificial crystal. Various methods may be used for manufacturing the artificial pleochroic crystals.

Figure 1B:
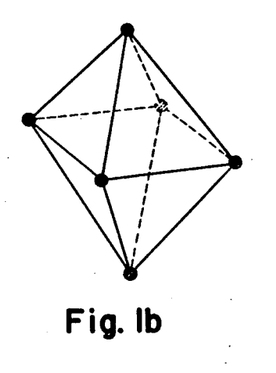
Figure 1C:
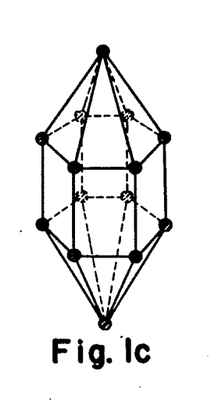
Figure 1D:
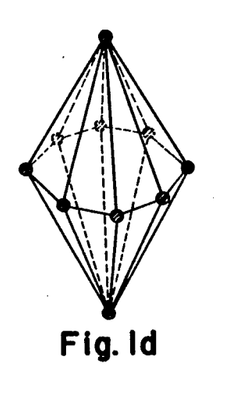

An uniaxis artificial crystal, having rectilinear pleochroism, is obtained in locating the conducting molecules in accordance with the meshes of the following crystallographic systems: rhombohedric or ternary (see Fig. 1a)—quadratic or quaternary (see Fig. 1b and Fig. 1d)—hexagonal or senary (see Fig. 1c). To manufacture such a structure, I fix for example, on thin isotrope dielectric sheets (like those of Fig. 1h), metallic elements of convenient shape and dimensions, in such a way that their relative positions correspond to those of the chemical molecules in a natural crystal belonging to the considered crystallographic system. These chemical molecules are represented schematically by little hatched circles at the apexes of the polyhedrons of Fig. 1a to Fig. 1d. Then, I place a number of such sheets one above the other with a convenient distance between two consecutive sheets. For fixing these "molecules" on a sheet, I may use a mechanical process (weaving—projection of metallic elements with compressed air through a grid—printing with electrically conducting inks, etc. . . .), or a photochemical process (photography, photo-engraving, etc. . . .), or a physical process (cathodic precipitation, condensation of vapours), or an electromagnetic process. For applying said electromagnetic process, I make first a suspension of very small metallic particles in a dielectric material which is initially in a liquid state; then I let this dielectric material become solid (solidification, or gelification, or evaporation) while it remains under the action of convenient electric or magnetic fields (or both electric and magnetic fields) which orientate the metallic particles in the desired manner; under the action of said fields, the molecules take the desired relative positions in the meshes of the desired crystallographic system, while the dielectric is still liquid. The solidification of said dielectric (always under the action of said fields) immobilizes afterwards these metallic particles in said desired positions. In this process, I may use, as dielectric, paraffin with a low melting point mixed with Vaseline (petroleum jelly) in order to make the fused paraffin less fluid and moreover to make more progressive the solidification of the paraffin afterwards. Instead of paraffin, I may use purified ozokerite (also mixed with some Vaseline) in distilled petroleum. I may use also a solution of vinyl acetate in acetone (or in toluene or in ethyl-acetate)—or I may use a solution of vinyl chloride in cyclohexanone. I may also use liquid styrolene (or a solution of styrolene in acetic ether or in toluene), the polymerisation of which is obtained under the influence of light, possibly in an atmosphere of azote with benzole-peroxyde as catalyser. I let these solutions (containing the small metallic elements in suspension) evaporate while remaining under the action of the electric and magnetic fields. If these metallic elements are small enough to constitute a suspension (without falling on the bottom of the container), but are large enough to get only a small thermal agitation (brownian motion), the desired orientations of said elements may be complete with a field of moderate intensity (a few thousands of gauss for the magnetic field or a few hundreds of volts per centimeter for the electric field); but, because of the viscosity of the dielectric which shows the process of orientation, it is necessary to apply the fields during a sufficient time, and moreover these fields must be maintained until the solidification (or evaporation) of the supporting dielectric is completed.

Figure 1E:
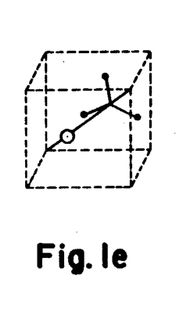
Figure 1F:
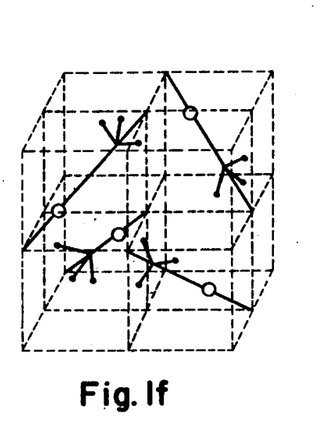
Figure 1G:
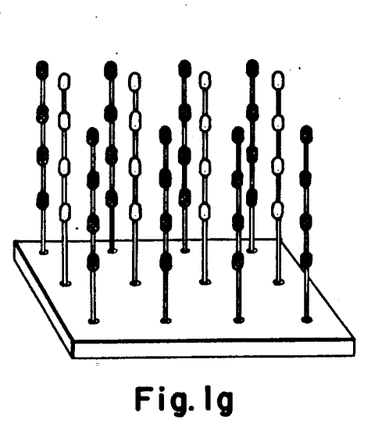
Figure 1H:
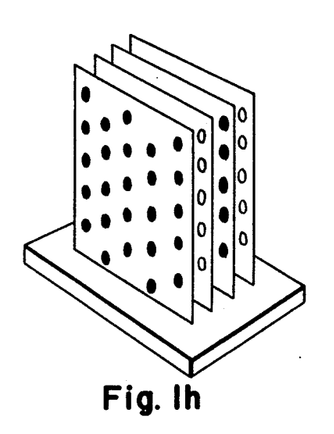

An artificial pleochroic crystal, manufactured as described above, may be considered as a "smectic structure" (made of parallel layers of molecules represented schematically on Fig. 1h), or as a "nematic structure" (made of parallel rows of molecules represented schematically on Fig. 1g). A smectic structure, constituted by superposed layers having alternately a refraction index $n_1$ or $n_2$ and a thickness $e_1$ or $e_2$ (with $e_1+e_2=1$) has the same properties as a natural uniaxis crystal, the optical axis of which would be perpendicular to the layers; the ordinary refraction index of said smectic structure is $$n_o = \sqrt{e_1 n_1^2 + e_2 n_2^2}$$

and its extraordinary refraction index is $$n_e = \sqrt{\frac{e_1}{n_1^2} + \frac{e_2}{n_2^2}}$$

A nematic structure, constituted by parallel rows of molecules occupying a small fraction of the total space equal to $p$ (inside a supporting material having a refraction index equal to $n$), has the same properties as a uniaxis natural crystal, the optical axis of which would be parallel to said rows of molecules; the ordinary refraction index of said nematic structure is $n_o = n$ and its extraordinary refraction index is $n_e = n(1+p)$.

Said smectic structures are represented schematically on the appended drawings by a few parallel dotted lines which are the traces of the parallel layers on the input surface of the artificial crystal. . (In the case of a nematic structure, the rows of molecules are perpendicular to the dotted lines shown on said drawings.)

An artificial crystal having circular pleochroism is obtained in locating (inside an isotrope dielectric having a small high frequency power factor) parallel rows of "molecules" (which by themselves are not at all symmetrical, or in any case have an intrinsic symmetry of an inferior order compared to the symmetry of the crystallographic system to which belongs the considered artificial crystal), in such a way that along a given row (parallel to the axis of said crystallographic system) the successive molecules have different and regularly alternate orientations. In other words, along a given row, a molecule is oriented relatively to the other as if it had rotated around the axis of said row by a sub-multiple of $2\pi$ radians (the axis of said row is parallel to the crystallographic axis of the artificial crystal, but is not an axis of symmetry for the "molecule" itself). According to the direction of said rotation, the artificial crystal transmits only the left (or the right) circular vibration for rays parallel to the crystallographic axis, the other circular vibration being practically completely absorbed. Fig. 1e represents, by way of example, one dissymmetrical "molecule" constituted by four "atoms" (metallic or dielectric granules) represented by a white circle and three black points, and connected together by very thin wires of dielectric material having very small losses at high frequency—said "atoms" being located at the apexes of an irregular tetrahedron (which could not be superposed on its image in a mirror). In Fig. 1f, four dissymmetrical molecules of this type are represented together, with different orientations, in the lattice of a cubic crystal (similar to the sodium chloride), which is one of the natural materials having rotatory power. It is well known that the phenomenon called "circular dichroism" is observed in such materials (having rotatory power) when two circular vibrations of the same frequency travel with different speeds and also with different attenuations. For manufacturing such artificial crystals having circular pleochroism, I place on dielectric thin rods (or along dielectric threads), at regular intervals (as represented schematically in Fig. 1g), conducting molecules which are similar to each other, but are given successively different and regularly alternate orientations. Then I fix the rods (or threads), bearing these molecules, on the walls of a container (made of dielectric material) in such a way that these rods are (and remain) parallel to each other, at convenient distances from each other. I may also manufacture an artificial crystal having circular pleochroism in superposing thin sheets of artificial crystals having rectilinear pleochroism, provided that, along a line perpendicular to the planes of the thin sheets with rectilinear pleochroism, the successive molecules have different and regularly alternate orientations.

The artificial crystals having circular pleochroism are represented schematically on the appended drawings by circular arrows rotating towards the right if the artificial crystal transmits, without an excessive absorption, the right circularly polarized vibration and practically completely absorbs the other vibration (left circularly polarized).

The artificial pleochroic crystals are in my invention associated with the receiving apparatus for discriminating the simultaneously transmitted signals from each other. An object of my invention is to utilize such artificial pleochroic crystals in various electrical systems which will now be described with the aid of the accompanying drawings in which.

The various receiving systems according to the invention are given only as examples, and any expert in the electrical communication art can imagine other combinations within the scope of my invention.

Figure 2:
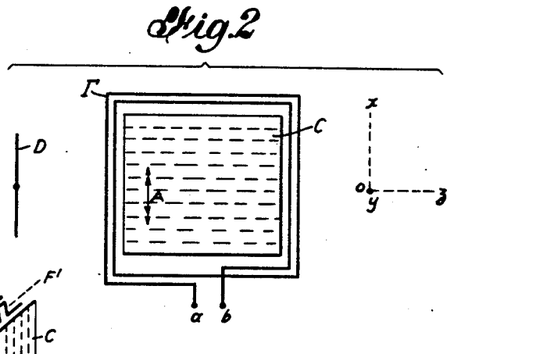
Figure 2 shows the association of a radio-receiving loop with an artificial crystal C having a rectilinear pleochroism.

Referring to Figure 2, $\Gamma$ is a radio-receiving loop antenna, the winding of which has only two turns on the drawing, and the terminals of which are $a$, $b$; this loop is "associated" to an artificial crystal C having rectilinear pleochroism and the crystallographic axis of which is A, parallel to the plane of the loop. Crystal C is, for example, made of layers of conducting molecules, all perpendicular to the plane of the loop, and the traces of these layers on said plane are shown as dotted lines; C acts upon the rectilinearly polarized electromagnetic waves (emitted by an hertzian doublet D) like the tourmaline crystal L of Figure 1 acts upon luminous waves.

Loop $\Gamma$ and crystal C are "associated," that is to say they are mechanically connected together (the crystal being always interposed between the doublet emitting hertzian rays and the loop), so that, when the loop is rotated, the artificial crystal is also rotated at the same time; for example the loop $\Gamma$ is placed in a parallelepipedic hole cut inside the artificial crystal C. Let us consider three coordinate axes $ox$, $oy$, $oz$ ($ox$ and $oz$ lying in the plane of the loop, and being respectively parallel and perpendicular to the crystallographic axis A, whereas $oy$ is perpendicular to the plane of the loop); the received intensity is maximum if the electric vector E of the incident electromagnetic waves is parallel to $ox$ (or to A) whereas the magnetic vector H is parallel to $oy$ (or perpendicular to the plane of the loop); in other words, the loop will be particularly sensitive to the hertzian waves emitted by a rectilinear (half wave length) antenna D located in the plane of the loop $\Gamma$ and parallel to the crystallographic axis A of the artificial pleochroism crystal C. If the system "loop-crystal" is rotated around axis $oy$ or axis $oz$, the absorption of energy produced by crystal C increases very rapidly; if this system is rotated around axis $ox$, which is parallel to the crystallographic axis A, this absorption of energy produced by crystal C does not vary, but in this case the magnetic vector H of the wave emitted by doublet D is no more perpendicular to the plane of the loop, the flux through the loop decreases, and consequently the high frequency voltage received across the terminals $a$, $b$ decreases also. The association of an artificial pleochroic crystal C with a loop antenna $\Gamma$ increases very much the directivity of said loop, the maximum received intensity being obtained for the rectilinearly polarized waves emitted by a doublet D lying in the plane of the loop, and parallel to the crystallographic axis of the artificial crystal (having rectilinear pleochroism).

Figure 3:
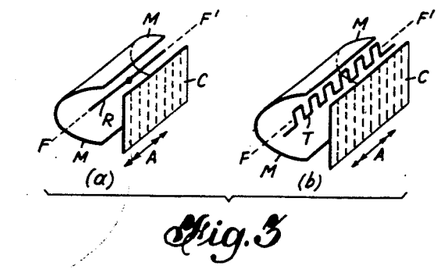
Figure 3a shows the association of a hertzian doublet resonator R with an artificial crystal C having rectilinear pleochroism; a parabolic cylindrical mirror M is located behind, R being along the focal axis FF' of said mirror.
Figure 3b shows the association of a row of thermo-electric couples in series T with an artificial crystal C having rectilinear pleochroism; again a parabolic cylindrical mirror M is located behind, T being along the focal axis FF' of said mirror M.

Figures 3a and 3b show two other radio-receiving systems according to my invention embodying also an artificial crystal C having rectilinear pleochroism, the crystallographic axis of which is A. Said crystal absorbs nearly completely all the electromagnetic waves, except those which have an electric vector parallel to A. Behind said crystal is a cylindrical mirror M, the cross-section of which is a parabole; along the focal axis FF' of said mirror M is located a hertzian resonator R connected to a radio-receiving set not shown on the drawing; mirror M concentrates all the hertzian rays transmitted through C on said resonator R. On Figure 3b, the resonator R is replaced by a row T of soldered points of thermo-electric couples (for example couples constituted by a small piece of manganine and a small piece of constantan soldered together); all these couples are connected in series, and the terminals of this arrangement are connected to a radio-receiving set not shown on the drawing.

Figure 4:
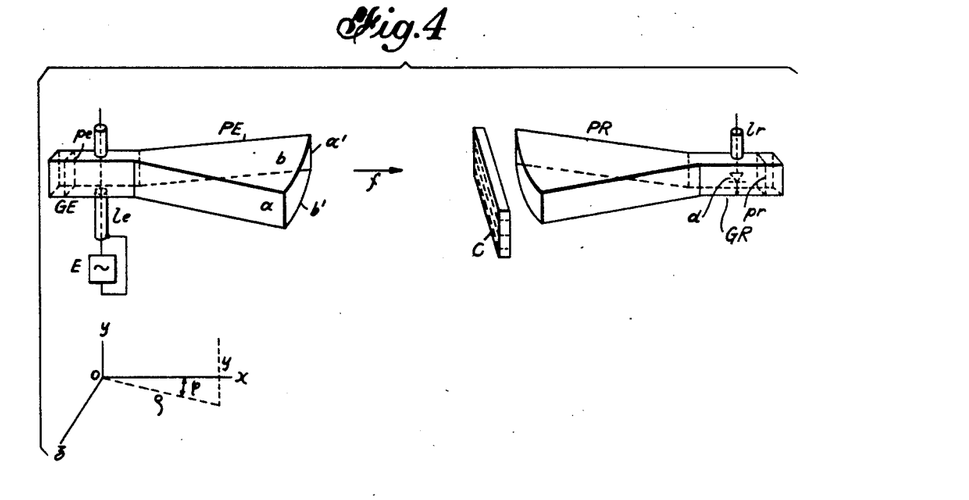
Figure 4 shows a telecommunication system using centimetric waves and in which an artificial crystal C having rectilinear pleochroism is located in front of a radioreceiver having a metallic horn PR extended by a portion of wave guide GR adjusted by means of a movable piston $pr$ and in which is located a crystal detector $d$.
Figure 5:
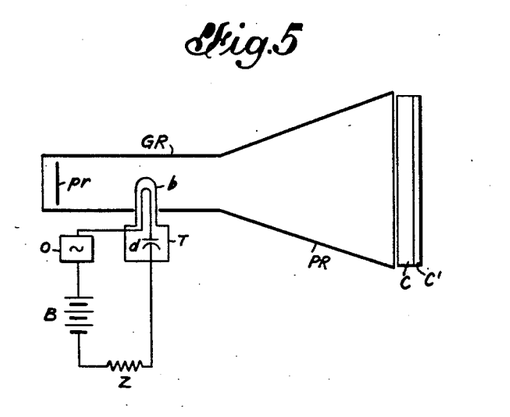
Figure 5 shows a modification of Fig. 4 where use is made of a frequency changing circuit comprising in series a coupling loop $b$, a diode $d$ (with small electron transit time), a local oscillator $o$, a biassing battery B and an output impedance Z.

Figures 4 and 5 concern the application of my invention to waves of super high frequencies (or "centimetric" waves). Figure 4 shows schematically a radioelectric channel utilizing such waves of type H, characterized by a rectilinear polarized electric field E without radial component ($-Ey$, $E\rho$, $E\varphi$ being the components of the electric vector in a system of cylindrical coordinates $y$, $\rho$, $\varphi$). It is well known that other types of waves may be used, and particularly waves of type E characterized by a magnetic field H without radial component ($H\rho=0$). Also other types of apparatus than those represented on Figure 1 may be used for generating, transforming or receiving waves of super high frequencies of either type. These apparatus, such as wave-guides, metallic horns having other forms than the sectoral horns shown on Figure 1, etc., are well known in the technique of centimetric waves.

The emitting set shown on the left of Figure 4 comprises: an osicllator E, generating super high frequency waves, and which is, for example, a vacuum tube with modulation of the velocity of the electrons emitted by the cathode, a coaxial line is connected to the terminals of oscillator E and the inner conductor of which goes alone through the wave-guide GE (of rectangular cross-section), said inner conductor being perpendicular to the horizontal surfaces of said wave-guide. Said coaxial line $le$ is tuned on both sides of wave-guide GE, in such a way that wave-guide GE is matched to the oscillator E. Thus, electromagnetic waves of type H are produced inside the wave-guide GE, and their electric vector $Ey$ (direction of polarization) is parallel to the inner conductor of coaxial line $le$; the reflecting piston $pe$ sends all the energy in the desired direction $f$ parallel to axis $ox$). These rectilinearly polarized waves enter into the metallic sectoral horn PE, having two horizontal bases $b$, $b'$ (in form of circular segments) and two vertical sides $a$, $a'$ (in form of rectangles lying in two planes containing the axis of the cylinder of which PE is a fraction). It is assumed that the metal of horn PE has an infinitely high electric conductivity, and that the dielectrics inside wave-guide GE and inside horn PE have the same dielectric constant $\epsilon_0$ and the same magnetic permeability $\mu_0$ as the surrounding free space. Near the small end or "throat" of the horn PE, the radial component of the magnetic field $H_\rho$ is still of considerable magnitude; but in the distant part of the horn PE, this component becomes negligible compared to the other two components of the field, that is to say compared to $Ey$ (vertically polarized electric field) and to $H\varphi$ (component of magnetic field which is tangent to the surface of the cylinder having $oy$ as axis). At the end or "mouth" of the horn, the magnetic and the electric lines of force are normal to each other and to the direction of propagation $f$, and the waves inside the mouth of the horn behave very much as do transverse, cylindrical, electromagnetic waves in free space. If the sides of the horn are terminated to form a "mouth" in this distant region, and if we assume that this termination does not materially effect the wave near the mouth, these substantially transverse cylindrical waves continue their propagation outward into the surrounding free space, forming a beam which has a definite angular spread because of the limited dimensions of the mouth of horn PE.

The characteristic impedance of horn PE in the neighbourhood of the mouth and for the radial direction $f$ is $$Z_0 = -\frac{Ey}{H\varphi}$$

it is approximately a pure resistance equal to $$\sqrt{\frac{\mu_0}{\epsilon_0}}$$

for high values of $$2\frac{\pi\rho}{\lambda}$$

$\lambda$ being the wavelength for a plane wave in an infinite medium having the magnetic permeability $\mu_0$ and dielectric constant $\epsilon_0$ of the dielectric in PE. The surrounding free space having also an intrinsic impedance equal to $$\frac{a}{A} = \sqrt{\frac{\mu_0}{\epsilon_0}}$$

if $a$ is the amplitude of the electric field and $A$ the amplitude of the magnetic field in the polarized plane wave propagated beyond PE, there is practically no discontinuity of impedance at the mouth of horn PE.

In the usual centimetric waves channels, the element C represented on Figure 4 would not exist, and the beam projected by emitting horn PE would reach without modification the receiving horn PR similar to PE, and then generate oscillations in the resonant chamber constituted by wave guide GR (of rectangular cross-section) and closed by the movable piston $pr$; the tuned crystal detector $d$ (Carborundum, or iron pyrites, or galena, or molybdenite, but preferably silicon, with a contact wire of tungsten or Phosphor bronze) rectifies the high frequency currents and feeds a radio-receiving set not shown in Figure 4. The dimensions of wave guide GR, the length of coaxial line $lr$, the length of the open conductor on which lies the detector $d$, the position of piston $pr$, the shape and the dimensions of horn PR are chosen (or adjusted) in order to obtain a resonance on the wavelength which it is desired to receive, an absence of disturbing reflections, and a good impedance-match. When this adjustment is completed, the "peaks" and "valleys" of the stationary state in the space between horn PR and detector 4 disappear; the condition of maximum energy in the radio-receiving set is then satisfied.

In my invention, a number of transmission paths, similar to the centimetric waves channel shown on Figure 4, are used simultaneously, each path being characterized by a definite state of polarization of the waves, and in front of the receiving horn PR is located an "artificial pleochroic crystal" C (see Figure 4), the structure of which is adapted to said state of polarization, and which is given a convenient orientation related to the electric vector of the waves to be received. On Figure 4, it is, for example, assumed that crystal C is constituted by a number of horizontal layers of conducting particles inside a dielectric medium, so that the crystallographic axis is parallel to $oy$, direction of the electric vector of the received waves.

To avoid (or reduce) the impedance discontinuities and consequently the reflections of the waves and the resulting energy losses, the following steps are taken, as shown on Figure 5: first, the artificial pleochroic crystal comprises two parts, a principal one C located very close to horn PR, and an auxiliary one C', located between C and the surrounding free space; the constants of the materials of which C and C' are made are chosen in such a way that the intrinsic impedance of C' has a value between the value of the intrinsic impedance of C and the value of the intrinsic impedance of the surrounding free space; thus C' acts as a "taper" for impedance-matching. Secondly, the horn PR and the waveguide GR are filled with the same dielectric as the dielectric used for making the principal artificial crystal C, or in any case, they are filled with a material having an intrinsic impedance equal to the impedance of C, as nearly as possible.

The radial impedance (for the spherical wave emitted by a doublet, at a distance, from said doublet, large compared to the wavelength) is substantially equal to the intrinsic impedance of the medium. If said medium has a magnetic permeability $\mu$, a dielectric constant $\epsilon$ and an electric conductivity $g$, if $$i = \sqrt{-1}$$

and if $\omega$ is equal to $2\pi$ times the frequency, then the intrinsic impedance of the medium is given by the formula:

$$\sqrt{\frac{i\omega\mu}{g + i\omega\epsilon}}$$

For the medium constituting an artificial pleochroic crystal, if the amount of conducting material ("molecules") is small compared to the amount of dielectric material (supporting dielectric), as the frequency is high in the case of hertzian waves, the above formula reduces to $$\sqrt{\frac{\mu}{\epsilon}}$$

If non-magnetic materials are used for "molecules" of the crystal, $\mu$ is substantially equal to the permeability of air, and the intrinsic impedance of such an artificial crystal varies like the inverse of the square root of the dielectric constant of supporting dielectric.

In the receiving system (according to my invention) shown on Figure 5, instead of a crystal detector, use is made of a frequency-changing-circuit comprising a vacuum tube T having a thin part located inside wave-guide GR and containing a coupling loop $b$, and a larger part (outside wave-guide GR) containing a diode $d$ having a small electron transit time. The loop $b$ picks up the useful signal (incident electric voltage VI) and is connected to diode $d$ and to a local oscillator O (positive grid vacuum tube, for example) generating the local electric voltage V2. The circuit is closed by a biasing battery B and an output impedance Z. The incident voltage VI (of frequency $f1$) being small compared to the local voltage V2 (of frequency $f2$), the curvature of the characteristic "current-voltage" of diode $d$ introduces a number of demodulation products, among which the component of frequency $(f1-f2)$ (the useful signal) is obtained across the terminals of impedance Z, which is precisely tuned to said frequency $(f1-f2)$.

Figure 12:
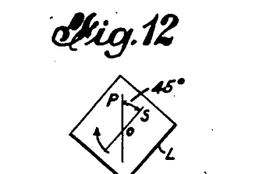
Figure 12 illustrates the principle of a circular polarizer.

Instead of using, in the receiving systems hereabove described, an artificial crystal having rectilinear pleochroism, I may use an artificial crystal having circular pleochroism, if the transmitted signal to be selected is carried by a circularly polarized wave (left or right) instead of a rectilinear polarized wave. It is well known in optics that a "circular polarizer" is obtained in associating together a "rectilinear polarizer" and either a crystal having a thickness equal to one quarter of wavelength, or a Fresnel parallelepiped (made of an isotrope material and providing two successive reflections of the wave). On Figure 12 the vertical vector OP represents the principal section of the rectilinear polarizer (or the direction of the rectilinearly polarized vibration at the output of said polarizer, or the electric vector of the outgoing wave); OS is the "principal section" of the "quarter-wave-length-crystal" $\Gamma$ (being assumed that said crystal delays the vibration lying in its "principal section" by comparison with the vibration perpendicular to its "principal section") or OS is the azimuth of the plane of the two reflections produced by the Fresnel parallelipiped; OS and OP make between them an angle of 45 degrees (or $\frac{\pi}{4}$ radians)

then, at the output of the "quarter-wavelength-crystal" (or at the output of the Fresnel parallelepiped) a right circular vibration is obtained. If OP were horizontal, instead of vertical, the vibration obtained would be a left circular vibration, because the circularly polarized vibration has always the direction in which one must rotate OP (rectilinearly polarized vibration) to bring it on OS (retardated vibration), by means of a rotation inferior to 90 degrees (or $\frac{\pi}{2}$ radians)

Figure 13:
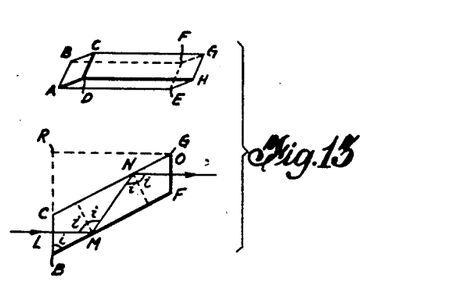
Figure 13 represents a Fresnel parallelepiped.

The Fresnel parallelepiped shown on Figure 13 is an oblique parallelepiped made of isotrope material and having two rectangular bases ABCD, EFGH; and its dimensions and shape are such that a beam of parallel rays introduced perpendicularly to one basis in $\Gamma$ will come out of the other basis in O with the same direction, after two successive reflections on the side surfaces ABEF and DCGH; the incidence angle $i$, for said reflections, depends on the refractive index of the material of the parallelepiped; said device transforms an incident rectilinearly polarized vibration in an outgoing circularly polarized vibration, the outgoing beam being parallel to the incident beam, but laterally shifted by an amount $CR = 2h \sin^2 i$, if $h = BC$ is the width of said incident beam. The Fresnel parallelepiped is better than the "quarter-wavelength-crystal" because it is (so to say) "achromatic," being efficient in a large wave length interval, as a device for transforming a rectilinearly polarized wave into a circularly polarized wave, or vice versa.

Figure 14:
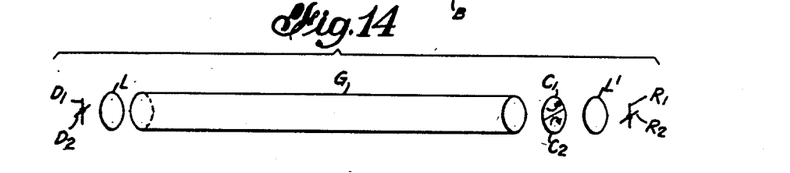
Figures 14 and 15 show the association of hertzian doublets resonators $R_1$, $R_2$ with artificial crystals $C_1$ $C_2$ having circular pleochroism; in the case of Figure 14, half-wave-length natural crystals L, L' are used for converting a rectilinearly polarized wave in a circularly polarized wave or vice-versa, whereas in the case of Figure 15, use is made of isotrope Fresnel parallelepipeds for the same purpose.
Figure 15:
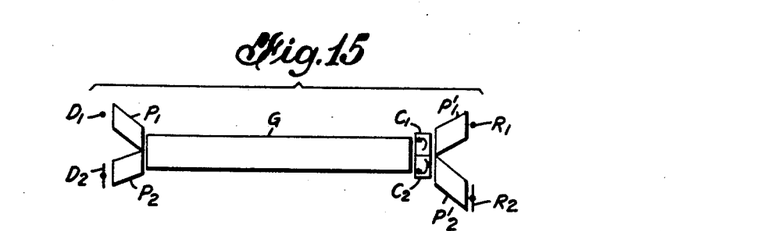

Figure 14 shows, by way of example, the association of an artificial crystal having circular pleochroism ($C_1$ transmitting only a left circular vibration or $C_2$ transmitting only a right circular vibration) with a "quarter-wavelength-crystal" $\Gamma'$ and an hertzian resonator ($R_1$ or $R_2$). Figure 15 shows the association of an artificial crystal having circular pleochroism ($C_1$ or $C_2$) with a Fresnel parallelepiped ($P_1$ or $P_2'$) and an hertzian resonator ($R_1$ or $R_2$).

These two cases correspond, for circular vibrations, to the receiving system (for rectilinear vibrations) shown on Figure 3a. On said Figure 3a, if C represented an artificial crystal having circular pleochroism and if a "quarter-wavelength-crystal" or a Fresnel parallelepiped were interposed between C and R, the arrangement of Figure 14 or 15 would obviously be obtained.

In the same manner, it is possible to derive from Figures 2, 3b, 4 and 5 respectively other types of receiving systems (according to my invention) adapted to circularly polarized waves; in each case, C (or C and C') would then represent an artificial crystal having circular pleochroism, and either a "quarter-wavelength-crystal" or a Fresnel parallelepiped would be placed just behind C (that is to say between C and T on Figure 3b, between C and PR on Figure 5, and, in the case of Figure 2, along the walls of the cavity dug inside C, in which the winding of $\Gamma$ is enclosed).

Figures 6 to 15 concern various applications of my invention, which are given in way of examples; but many other applications could be imagined easily by any expert in the electrical telecommunication art.

Figure 6:
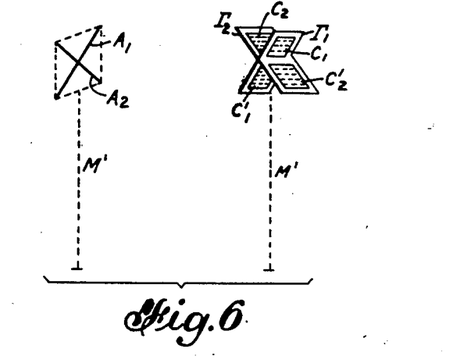
Figure 6 represents a double radioelectric transmission (in the same frequency band) with emitting hertzian doublets and receiving loop antennas associated with artificial pleochroic crystals.
Figure 7:
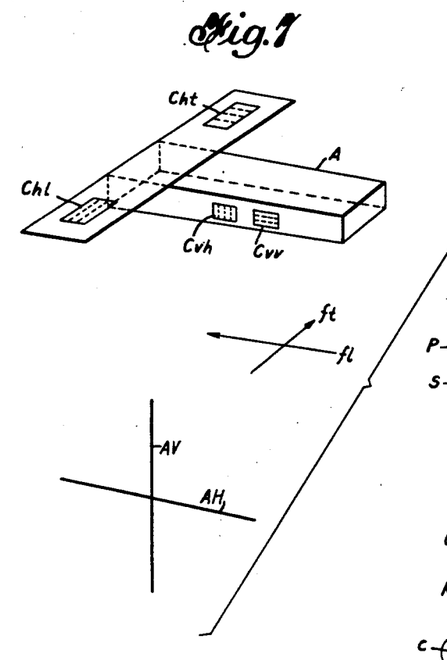
Figure 7 represents an installation for guiding airplanes by radioelectricity along an airway.
Figure 8:
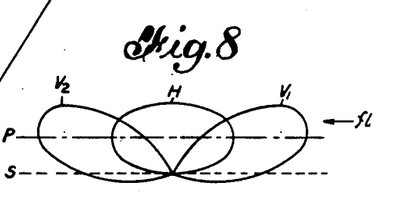
Figure 8 represents the directional diagram of the emitting antennas used in said installation.
Figure 9:
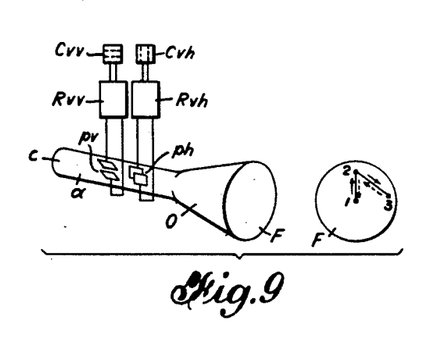
Figure 9 shows a part of the radioreceiving set on board of an airplane (guided by said radioelectric method), embodying artificial pleochroic crystals.
Figure 10:
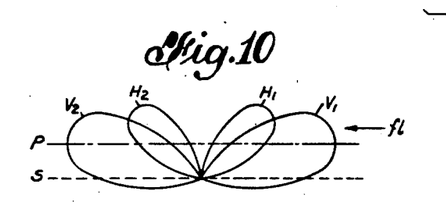
Figure 10 represents another directional diagram corresponding to other type of emitting antennas for said installation.

Figure 6 represents a double transmission (with the same frequency band) between two fixed or mobile radioelectric stations, utilizing artificial crystals with rectilinear pleochroism; it is assumed that emitting hertzian doublets and receiving loop antennas are used, but any of the hereabove described receiving systems in accordance with my invention may be used in lieu thereof. Figure 7 represents the application of my invention to guiding airplanes by radioelectricity along an airway; Figure 9 shows a part of the arrangement of the radio-receiving set on board of a guided airplane; Figure 8 represents the directional diagram of the emitting antennas used in one of the radioelectric guiding stations (as shown on the lower part of Figure 7); Figure 10 represents the directional diagram of other emitting antennas which could be used, as an alternative, in said guiding radioelectric station.

Figure 11:
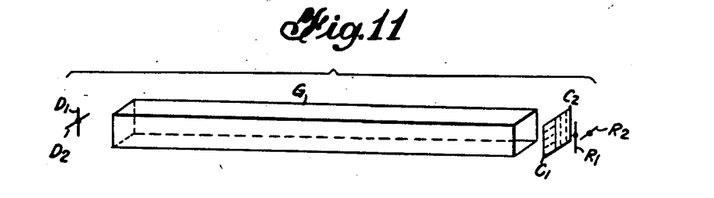
Figure 11 illustrates the principle of a two-way telecommunication by means of a single long distance wave guide with associated artificial pleochroic crystals.

Figures 11 to 15 concern the application of the multiple transmission system (in accordance with my invention) to electrical communications between fixed stations by means of "long distance wave-guides" (metal pipes or dielectric tubes); in Figure 11 a wave-guide of rectangular cross-section is used in conjunction with artificial crystals $C_1$, $C_2$ having rectilinear pleochroism, whereas in Figures 14 and 15, a wave-guide of circular cross-section is used in conjunction with artificial crystals $C_1$, $C_2$ having circular pleochroism; Figures 12 and 13 are schematics explaining the behaviour of the devices used in Figures 14 and 15 respectively for converting a rectilinearly polarized wave into a circularly polarized wave, or vice versa.

Figure 6 shows the mast M of the emitting radioelectric station, on top of which are two rectilinear half-wave antennas $A_1$, $A_2$ (length equal to $$\frac{\lambda}{2})$$

emitting simultaneously two different signals utilizing the same frequencies (comprised between $$\frac{v}{\lambda+a} \text{ and } \frac{v}{\lambda-a}$$

$v$ being the velocity of propagation of hertzian waves in free space and $2a$ being the width of the modulation band, which is small compared to $\lambda$). It is assumed that waves of ultra high or super high frequencies are used; in order to have a good directivity towards the receiving mast M', in order to reduce the effects of the earth, and in order to reduce as much as possible the space occupied by the antennas $A_1$ and $A_2$, said antennas are located along the branches of a Saint Andrew's cross, on the top of mast M, each making an angle of 45 degrees with the horizontal plane. These antennas thus produce hertzian waves which are both rectilinearly polarized, but in rectangular directions. In order to increase the power radiated towards M', I may use, behind each antenna $A_1$ and $A_2$, a reflector which is another similar antenna, located at a distance equal to one quarter of wave-length and fed with a difference of phase equal to one quarter of period, and the directional diagram thus obtained has the shape of a cardioid; if waves of super high frequencies are used, I may place behind each doublet ($A_1$ or $A_2$) a reflecting cylindrical mirror, the axis of which is parallel to said doublet and the cross-section of which is a parabole or a half-circle according to the desired directive effect; these mirrors or reflecting antennas are not shown on Figure 6. Mast M' in the radio-receiving station bears, on the top, two loop antennas $\Gamma_1$, $\Gamma_2$ lying in rectangular planes and respectively "associated" with artificial crystals $C_1$, $C_1'$, $C_2$, $C_2'$ having rectilinear pleochroism. If the planes of said loops are directed towards the emitting station (M) and if the crystallographic axis of artificial crystal $C_1$, $C_2$ are made parallel to antenna $A_1$, the conditions of optimum reception by $\Gamma_1$ of the signal emitted by $A_1$ are satisfied; at the same time, automatically, $A_2$ is brought in the plane of loop $\Gamma_2$, and parallel to the crystallographic axis of artificial crystals $C_2$, $C_2'$ associated with $\Gamma_2$: consequently loop $\Gamma_2$ receives in the best possible manner, the signal emitted by antenna $A_2$; because of the great directivity of the radio receiving systems "loop-crystal" in accordance with my invention, the signals emitted respectively by antenna $A_1$ and antenna $A_2$ are well discriminated from each other, although they cover the same frequency band and are transmitted along the same path, but with different states of polarization.

At the lower part of Figure 7, a radio emitting station for guiding airplanes along an airway is schematically represented by two emitting hertzian doublets (one vertical antenna AV and one horizontal antenna AH, both half-wave-antennas) supposed to be on the top of a high mast not shown on the drawing, in order that their radiation should not be too much disturbed by the presence of the earth below them. Let us assume that the part of the directional diagram thus obtained above the horizon S of these antennas has the shape shown on Figure 8, the "ear" H corresponding to the horizontal antenna AH, and the "ears" $V_1$ and $V_2$ corresponding to the vertical antenna AV, and the effect of the earth being taken into account. Antenna AH is parallel to the longitudinal arrow $fl$ which shows the direction of the airway that the airplane A (represented on the upper part of Figure 7), should follow; the body of airplane A, represented schematically by a parallelepiped, should thus remain oriented in the direction of arrow $fl$, whereas the wings of said airplane (schematically represented by a plane rectangle) should remain oriented in the direction of the transversal arrow $ft$. The use of waves of ultra high or super high frequencies is justified in this case for the following reasons:

(1) Short radio range, so that the same carrier radio frequency can be used in a number of emitting stations spaced along the airway at intervals of a few hundreds of kilometers (or even less), (2) Relative absence of fading of the received signals (except at very great distances or in very unfavourable locations).

The airplane A is assumed to have, lying on the lateral vertical surfaces of its body and on the plane of its wings, radio receiving systems in accordance with my invention, each constituted for example by the association of a loop antenna and of an artificial crystal having rectilinear pleochroism. For example, the crystal associated with loop $Cvh$, lying in the left lateral vertical surface of the body of airplane A) has its crystallographic axis parallel to the axis of the body of the airplane, whereas the crystal associated with loop $Cvv$ (also lying in the left lateral vertical surface of the body of airplane A) has its crystallographic axis perpendicular to the plane of the wings of airplane A. Consequently, if airplane A remains on the horizontal plane P (Figure 8) and follows faithfully the prescribed way (arrow $fl$), the radio receiving set $Rvv$ fed by $Cvv$ begins to receive the signal emitted by the vertical antenna AV when the airplane gets into the "ear" $V_1$ (Figure 8), whereas, at the same time, the radio receiving set $Rvh$ fed by loop $Cvh$ receives practically no signal. Afterwards, when airplane A gets into the "ear" H while remaining always in the "ear" $V_1$, the two radio receiving sets receive respectively the signals emitted by AH (stronger and stronger), and by AV (weaker and weaker). Afterwards, the radio receiving set $Rvh$ receives alone the signal emitted by AH, the maximum intensity being obtained when airplane A is just above the emitting station. Afterwards the same process begins again, but in a reversed order.

It is convenient to modulate the waves (emitted by AH and by AV with the same wavelength) by means of signals of two different low frequencies, characterizing the particular airway which is considered (for example 400 and 1100 cycles per second), said low frequency signals being themselves interrupted from time to time at the rhythm of Morse signals corresponding to the name of the particular guiding radioelectric station which is considered along said airway, this permits an audible recognition of the various emitting stations along the various airways, by means of telephone receivers connected at the output of electric filters (tuned on 400 and 1100 cycles per second, and inserted in the low frequency part of the radio receiving sets $Rvv$ and $Rvh$).

It is also possible to use a cathode ray oscillograph O (shown on Figure 9) with a fluorescent screen F on which the electrons (emitted by cathode $c$, put in motion by anode $a$, vertically deflected by plates $pv$ under the action of the signals received by $Rvv$ and rectified, horizontally deflected by plates $ph$ under the action of the signals received by $Rvh$ and rectified) build a luminous spot which follows the path represented on the right of Figure 9, going from 1 to 2 and then to 3 (arrows in solid lines) when airplane A approaches the guiding radioelectric station, and following the same path in a reversed direction (arrows in dotted lines) when airplane A flies away from said station.

The use, on board of the airplane, of a plurality of radio receiving systems according to my invention (for example systems of associated loop and artificial pleochroic crystal) located on the various surfaces of said airplane in such a manner that the speed of the airplane should not be reduced (see $Cvh$, $Cvv$, $Chl$, $Cht$, on the Figure 7) affords the possibility of determining with accuracy the exact position of the airplane before landing, or the possibility of simultaneous communication with other flying airplanes, while observing constantly the guiding signals sent by the stations located at regular intervals along the prescribed airway.

Instead of using, in such a guiding radioelectric station, two doublets (half wave antennas) AV and AH, as shown on Figure 7, it is possible to use one horizontal full wave antenna and one half wave vertical antenna; for such a case the directional diagram is shown on Figure 10, and the moment when the airplane is just above the guiding radioelectric station is then accurately determined because there is a "cone of silence" corresponding to the space between the "ears" $H_1$ and $H_2$ (Figure 10). The triangle 1, 2, 3 followed by the luminous spot on the fluorescent screen (Figure 9) is then closed, and is traced successively in two opposite directions by the luminous spot of fluorescent screen F when airplane A flies on plane P in the direction of arrow $fi$ (see Figure 10).

Figures 11 and 14 concern the application of my invention to a multiple transmission between two fixed stations by means of long distance wave-guide: G represents a wave-guide of rectangular cross-section on Figure 11, and a wave-guide of circular cross-section on Figures 14 and 15. It is assumed that two waves of the type $H_1$ are generated at one end of said wave-guide, by means of rectangular half wave antennas or doublets $D_1$ or $D_2$ (or by means of rectangular diametral electric wires, such as the inner conductor of coaxial line $le$ on Figure 4); the currents flowing in said doublets or wires $D_1$, $D_2$ should have a frequency sufficiently high, so that the corresponding electromagnetic waves can travel through the wave-guide G, and said currents are assumed to be modulated by the two low frequency signals to be simultaneously transmitted between the two stations. The waves produced by $D_1$ and $D_2$ are rectilinearly polarized, but their respective electric vectors are perpendicular to each other. In the case of Figure 11, it is assumed that said vectors are perpendicular to the horizontal and vertical surfaces of wave-guide G (of rectangular cross-section), and it is assumed also that said wave-guide G is very regular on its whole length. Under these conditions, the states of polarization of these two waves are well preserved during their propagation from the beginning to the end of wave-guide G. Two artificial crystals having rectilinear pleochroism ($C_1$ with a vertical crystallographic axis and $C_2$ with a horizontal crystallographic axis) separate the received waves from each other, and these waves are picked up respectively by resonators $R_1$ and $R_2$ (Figure 3a), or by thermocouples $T_1$ and $T_2$ (Figure 3b), or by metallic horns with crystal detectors (Figure 4) or by metallic horns with frequency changing circuits (Figure 5). The horns might be useful as "impedance matching elements" at the receiving end of a wave-guide, but they are not necessary, and the detector $d$ (on Figure 4 or 5) might be directly introduced inside the long distance wave-guide G at the receiving end.

In the case of Figures 14 and 15, the rectilinear polarized waves produced by $D_1$ and $D_2$ are transformed in circularly polarized waves (one left and one right) by means of the "quarter-wavelength-crystal" $\Gamma$ (Figure 14) or by means of the Fresnel parallelepipeds $P_1$ and $P_2$ (Figure 15). For centimetric or millimetric electromagnetic waves, sulphur crystal may be used (for example) as material for the "quarter-wavelength-crystal" $\Gamma$; and paraffin may be used (for example) as isotrope material for the Fresnel parallelepipeds. In the case of extremely short waves, similar to infra-red waves, natural salt NaCl could be used for manufacturing the Fresnel parallelepipeds. At the other end of the long distance wave-guide G (of circular cross-section) are artificial crystals $C_2$, $C_1$ having circular pleochroism and transmitting only; the first one, a right circular vibration, and the second one, a left circular vibration; said artificial crystals separate thus from each other the two waves carrying respectively the two signals which have been simultaneously transmitted; between said artificial crystals and the receiving resonators $R_1$, $R_2$ (or detectors of any of the hereabove mentioned types), a "quarter-wavelength-crystal" $L'$, or Fresnel parallelepipeds $P_1'$, $P_2'$ are interposed.

On Figures 6, 11, 14 and 15, it is assumed that two signals are transmitted simultaneously in the same direction; but my invention permits also to transmit simultaneously two signals (covering the same frequency band) in two opposite directions; in other words, my invention permits a two-way communication over the same channel with one single frequency band; my invention permits for example to utilize only one long distance wave-guide (instead of two) for a two-way communication between two distant stations, which is a very substantial saving.

My invention may also be applied to filtering a received modulated electromagnetic wave (carrying useful signals) in order to purify said wave and suppress the "parasitic waves" reaching at the same time the receiving station; these "parasitic waves" may have been generated either willingly or unwillingly at the emitting station, or they may have been produced along the path between the emitting and the receiving stations.

For example, in the case of a long distance transmission of signals by means of a wave-guide, the generation of the useful carrier wave at the emitting station is sometimes accompanied by an unwanted production of "parasitic waves," either because the emitting device has not a perfect geometrical position referred to said guide-wave, or because one is not able to produce directly a certain type of waves (for example, type $H_0$) and one is compelled to produce first another type of wave (for example type $E_0$)

and afterwards to transform it conveniently (by means of a transforming device such as a suitable grid, for example); in the latter case, there remains always, after the transforming device, a certain amount of the initially produced wave, which is then a "parasitic wave." On the other hand, a long distance wave-guide is well able to transmit various types of waves (types E or H), but most of these waves present a certain instability during their propagation along the guide; in particular, the practically unavoidable irregularities of the long distance wave-guide (slight changes of form of the cross-section, or "elbows" around obstacles of the ground on which the wave-guide has been laid) generate "parasitic waves" which, generally, have not the same structure or state of polarization as the principal wave (carrying the useful signals).

In the case of the radioelectric transmission also, the presence of obstacles on the path of the hertzian rays produces reflections, or refractions, or partial diffusions of the initial useful electromagnetic wave. If said initial wave was for example emitted by an hertzian doublet as a rectilinearly polarized wave at the emitting station, it will present a certain "ellipticity" when it reaches the receiving station, and this is generally a source of distortion of the transmitted signals.

In the two above mentioned cases, instead of a desired rectilinearly polarized plane wave (modulated by the useful signals), a slightly "elliptic wave" is obtained at the receiving station; said "elliptic vibration" can be decomposed in two rectilinear vibrations rectangular to each other, but with different phases; an artificial crystal having rectilinear pleochroism located in front of the receiving set and conveniently oriented (so that its crystallographic axis is parallel to the useful rectilinear vibration) attenuates very much the parasitic component, whereas the useful component is practically not attenuated, said artificial pleochroic crystal fulfils consequently the function of a purifying filter.

In the same manner, if at the beginning of a long distance wave-guide, for example, at initial circular vibration of a given direction (modulated by useful signals) had been generated, and if it was wanted to transmit it through the wave-guide at a distant station, the vibration received at said distant station could be decomposed in two circular vibrations of opposite directions (one right and one left); an artificial crystal having circular pleochroism located in front of the receiving set would attenuate very much the parasitic component, whereas the useful component would practically not be attenuated; said artificial crystal (associated with a "quarter-wavelength-crystal" or with a Fresnel parallelepiped) would then again fulfil the function of a purifying filter.

The "parasitic wave" travelling with the useful wave may also have been produced willingly at the emitting station in order to ensure (by interference) the privacy of the transmission; in such a case, the pleochroic artificial crystal used in the receiving station in accordance with my invention will suppress the parasitic wave and restore the purity of the useful signals.

Having now described my invention, what I claim as new and desire to secure by Letters Patent is:

1. An artificial crystal exhibiting pleochroic properties for filtering out of a mixture of differently polarized electromagnetic waves of the same wave length, a wave having a particular state of polarization, comprising a plurality of macro-crystalline configurations each including, conductive particles spaced from one another in a pattern to simulate an appropriate configuration of a pleochroic crystal, said particles being spaced apart a distance small with respect to the wavelength of said electromagnetic waves, and having dimensions small with respect to said wave length, and a dielectric medium of low high frequency power factor for supporting said particles.

2. An artificial crystal according to claim 1, wherein said conductive particles are arranged in a pattern simulating the macro-crystalline configuration of a crystal exhibiting rectilinear pleochroic properties.

3. An artificial crystal according to claim 2, wherein said dielectric medium comprises a stack of dielectric sheets, said conductive particles being fixed to said sheets at regular intervals.

4. An artificial crystal according to claim 1 wherein said conductive particles are arranged in a pattern simulating the macro-crystalline configuration of a crystal exhibiting circular pleochroic properties.

5. An artificial crystal according to claim 4 wherein said dielectric medium comprises a plurality of rods of dielectric material, said conductive particles being spaced at regular intervals along said rods, with different alternate orientations, said rods being grouped in parallel spaced relationship.

6. An artificial crystal according to claim 1 wherein said conductive particles are arranged in a pattern simulating the macro-crystalline configuration of a crystal exhibiting rectilinear pleochroic properties and said dielectric medium comprises a plurality of rods of dielectric material, said conductive particles being spaced at regular intervals along said rods, said rods being grouped in parallel spaced relationship.

7. An artificial crystal according to claim 1 wherein said conductive particles are arranged in a pattern simulating the macro-crystalline configuration of a crystal exhibiting circular pleochroic properties, and said dielectric medium comprises a stack of dielectric sheets, said conductive particles in said sheets being positioned to have different alternate orientations along a straight line perpendicular to the surfaces of said sheets.

GEORGES VALENSI.

References Cited in the file of this patent
UNITED STATES PATENTS

| Number | Name | Date |
|---|---|---|
| 1,724,922 | Heising | Aug. 20, 1929 |
| 1,794,878 | Weagant | Mar. 3, 1931 |
| 1,886,234 | Meissner | Nov. 1, 1932 |
| 1,918,848 | Land et al. | July 18, 1933 |
| 1,930,788 | Buckner | Oct. 17, 1933 |
| 1,962,610 | Nicolson | June 12, 1934 |
| 2,199,526 | McCowen | May 7, 1940 |
| 2,418,479 | Pratt et al. | Apr. 8, 1947 |
| 2,420,652 | Chilowsky | Mal 20, 1947 |
| 2,464,269 | Smith | Mar. 15, 1949 |